Feb. 16, 1965    E. G. OPSAHL    3,169,609
MULTI-GAUGE BRAKE BEAM
Filed Feb. 28, 1963    2 Sheets-Sheet 1
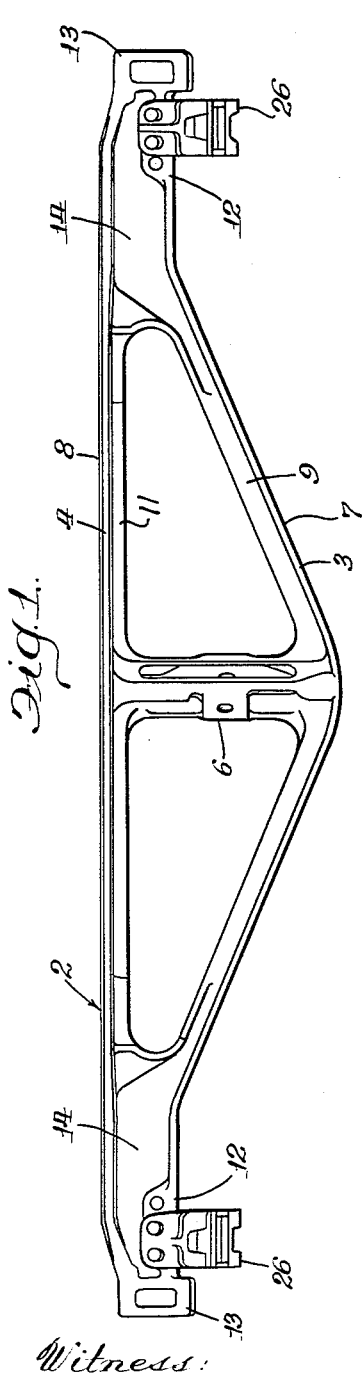
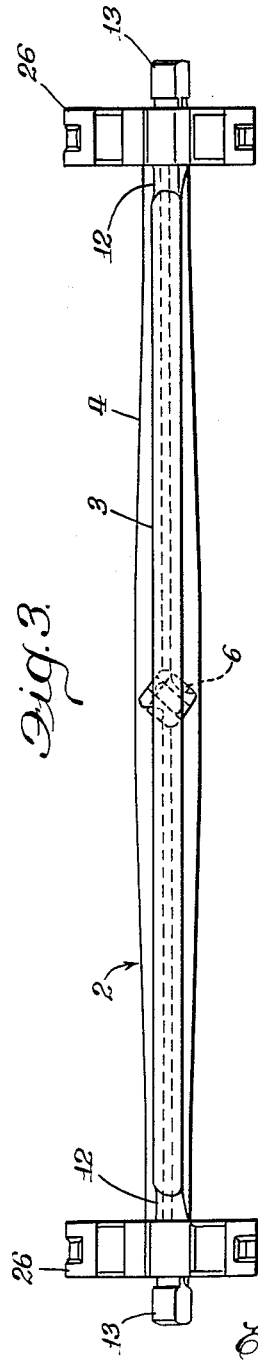
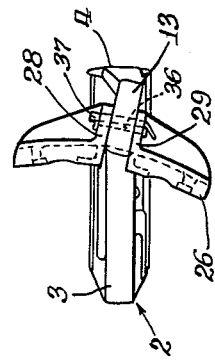
INVENTOR.
Eugene G. Opsahl
BY Walter L. Schlegel Jr.
Witness:
C. H. Bassett

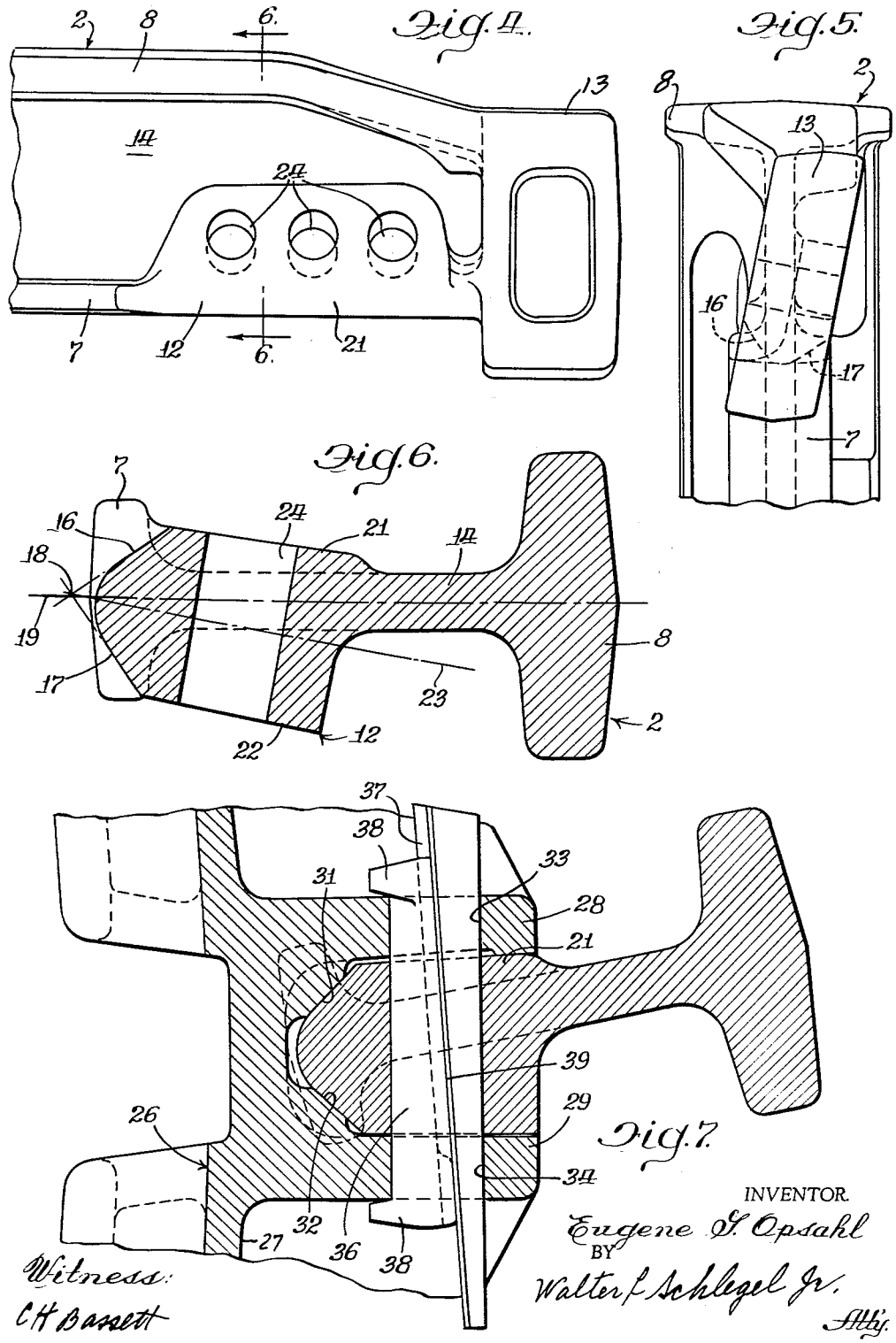

United States Patent Office 3,169,609
Patented Feb. 16, 1965

3,169,609
MULTI-GAUGE BRAKE BEAM
Eugene G. Opsahl, Chicago Heights, Ill., assignor to Amsted Industries Incorporated, Chicago, Ill., a corporation of New Jersey
Filed Feb. 28, 1963, Ser. No. 261,602
2 Claims. (Cl. 188—219.6)

This invention relates to brake beams for railway car trucks and more particularly to a truss type brake beam structure in which brake heads are detachably mounted on opposite ends of the beam.

An object of the invention resides in the provision of a brake beam structure embodying means for selectively varying the spacing between the brake heads, whereby the brake beam structure is adapted for use on trucks designed for different track gauges.

Another object of the invention resides in the provision of a truss type brake beam provided at its ends with coplanar seat portions adapted to be engaged between spaced mounting flanges formed on the brake heads, the seat portions and flanges being formed with apertures to receive wedge-lock retainer members.

A further object of the invention resides in the provision of a brake beam in which the seat portions are formed with wedge-shaped front faces for abutting engagement against inwardly converging seats formed in the brake heads, said seats being tightly engaged against said front faces by the wedge-lock retainer members.

Another object of the invention resides in the provision of a truss type brake beam embodying guide lugs coplanar with and outboardly from the seat portions, each lug having a recess formed in its upper side.

Another object of the invention resides in the provision of a truss type brake beam having tension and compression members of T-section to provide vertical front and rear webs merging at their ends with the seat portions and guide lugs, respectively, said webs being interconnected adjacent their ends by intermediate webs which merge with the seat portions and guide lugs.

The invention embodies other novel features, details of construction and arrangement of parts which are hereinafter set forth in the specification and claims and illustrated in the accompanying drawings, forming part thereof, wherein:

FIGURE 1 is a top plan view illustrating a multi-gauge brake beam structure embodying features of the invention.

FIGURE 2 is an end elevation of the structure shown in FIGURE 1.

FIGURE 3 is a front elevation of the brake beam structure.

FIGURE 4 is an enlarged fragmentary top plan view showing one end of the brake beam.

FIGURE 5 is an enlarged fragmentary end elevation of the brake beam.

FIGURE 6 is an enlarged transverse section taken along the line 6—6 of FIGURE 4.

FIGURE 7 is an enlarged transverse section showing a brake head assembled on the brake beam.

Referring now to the drawings for a better understanding of the invention, the multi-gauge brake beam structure is shown as comprising a cast steel truss type brake beam 2 having tension and compression members 3 and 4 interconnected by a strut 6. The members 3 and 4 are of T-section to provide vertical front and rear webs 7 and 8 and coplanar front and rear legs 9 and 11 extending toward each other.

The vertical front web 7 merges at its ends with seat portions 12 which, in turn, merge with their respective guide lugs 13. The vertical rear web merges at its ends with the rearward portions of the guide lugs 13. The front and rear legs 9 and 11 converge outboardly to merge at their ends with horizontal webs 14 coplanar with the legs and merging with the vertical front and rear webs 7 and 8, seat portions 12 and guide lugs 13.

As illustrated in FIGURE 6, each seat portion 12 is formed with a wedge shaped front surface defined by front faces 16 and 17 diverging rearwardly from an apex 18 approximately on the horizontal center line 19 of the horizontal web 14. Each seat portion 12 is provided with rearwardly diverging flat top and bottom surfaces 21 and 22 equidistantly spaced on opposite sides of the center line 23 which extends from the apex 18 downwardly and rearwardly at an angle of approximately 10 degrees from the center line 19.

Each seat portion 12 is shown as provided with three apertures 24 equidistantly spaced from the apex 18 and from each other and having their centers in a common plane normal to the center line 23, said plane being approximately parallel to the longitudinal axis of the brake beam.

Brake heads 26 are detachably mounted on their respective seat portions 12 to support conventional brake shoes. Each brake head is shown as comprising a body 27 having spaced rearwardly diverging flanges 28 and 29 adapted to straddle its seat portion and to snugly engage the flat top and bottom surfaces 21 and 22. Inwardly converging surfaces 31 and 32 are provided on the brake head between the inner ends of the flanges 28 and 29 for abutting engagement against the front faces 16 and 17. Two apertures 33 are formed in the flange 28 for alignment with two apertures 34 formed in the flange 29, the spacing between each pair of apertures being equal to the spacing between adjacent apertures 24 in the seat portions 12.

The brake heads 26 are detachably connected to their seat portions 12 by means of conventional lock and wedge key members 36 and 37 which extend through the apertures 24, 33 and 34. As illustrated in FIGURE 7, the lock member 36 is offset at its ends at 38 to engage the surfaces 21 and 22, and is formed with a wedge face 39 for engagement by the wedge key member 37. To insure a snug engagement of the brake head on the seat portion, the apertures 24 in the seat portion are offset rearwardly from the apertures 33 and 34 in the flanges 28 and 29, whereby the front faces 16 and 17 are tightly engaged against the surfaces 31 and 32 during insertion of the wedge key 37.

By providing a series of equally spaced apertures 24 in each seat portions 12, it will be noted that the brake heads 26 are adapted to spaced apart to correspond to different track gauges.

I claim:

1. In a brake beam structure, a one-piece cast steel truss type brake beam having tension and compression members of T-section to provide front and rear vertical webs and front and rear horizontal legs, said members being interconnected at their medial portions by a strut and converging outwardly therefrom to merge with horizontal webs disposed coplanar with said legs, seat portions extending along the forward portions of said horizontal webs and provided with rearwardly diverging upper and lower flat surfaces disposed above and below the horizontal webs, said seat portions being inclined downwardly and rearwardly at an angle of approximately 10 degrees from the horizontal webs and having vertically spaced rearwardly diverging flat front faces, guide lugs provided on the ends of the brake beam and disposed coplanar with said seat portions, said front vertical webs merging with said seat portions, and said horizontal webs and rear vertical webs merging with said guide lugs, each seat portion having three apertures equidistantly spaced from said front faces and from each other.

2. A brake beam structure according to claim 1 in which brake heads are provided with rearwardly diverging flanges straddling said seat portions and snugly engaging said upper and lower surfaces, each brake head having inwardly converging flat surfaces in abutting engagement against said rearwardly diverging flat front faces, said inwardly converging flat surfaces being vertically spaced apart by a recess provided in the brake head, said flanges having two openings in registry with two apertures in the seat portion, and lock and wedge key members extending through asid openings and apertures to detachably connect the brake head to the seat portion.

References Cited in the file of this patent

UNITED STATES PATENTS

| | | |
|---|---|---|
| 2,170,120 | Busch | Aug. 22, 1939 |
| 2,707,534 | Tack | May 3, 1955 |
| 2,873,824 | Opsahl | Feb. 17, 1959 |

FOREIGN PATENTS

| | | |
|---|---|---|
| 471,732 | Canada | Feb. 27, 1951 |
| 532,047 | Canada | Oct. 23, 1956 |